(12) United States Patent
Dalton, Sr.

(10) Patent No.: US 6,862,769 B1
(45) Date of Patent: Mar. 8, 2005

(54) VEHICLE WASHING DEVICE

(76) Inventor: Clifton Dalton, Sr., 13374 Robson St., Detroit, MI (US) 48227

( * ) Notice: Subject to any disclaimer, the term of this patent is extended or adjusted under 35 U.S.C. 154(b) by 18 days.

(21) Appl. No.: 10/656,971

(22) Filed: Sep. 8, 2003

(51) Int. Cl.$^7$ ............................................... A46B 13/06
(52) U.S. Cl. ................................. 15/24; 15/29; 15/97.3
(58) Field of Search ............................... 15/24, 29, 97.1

(56) References Cited

U.S. PATENT DOCUMENTS

| | | | |
|---|---|---|---|
| 1,471,748 A | * 10/1923 | Miller | ............................ 15/24 |
| 1,817,644 A | * 8/1931 | Pope | .............................. 15/24 |
| 2,723,407 A | * 11/1955 | Bardon | ........................... 15/24 |
| 4,207,640 A | 6/1980 | Sekula et al. | |
| 4,279,051 A | 7/1981 | Malcolm | |
| 4,374,444 A | 2/1983 | Zhadanov | |
| 4,417,826 A | 11/1983 | Floros | |
| 4,461,052 A | 7/1984 | Mostul | |
| D314,671 S | 2/1991 | Swanson et al. | |
| 6,314,603 B1 | * 11/2001 | Sobo | ............................. 15/29 |

* cited by examiner

Primary Examiner—Randall Chin

(57) ABSTRACT

A vehicle washing device includes an elongated tubular member having a first end and a second end. A coupler is fluidly coupled to the first end for coupling with a water supply hose. A housing includes a top wall and a peripheral wall. The second end of the tubular member is attached to the top wall of the housing and is fluidly coupled to a plurality of nozzles mounted in the housing. A plurality of spindles is rotatably mounted in the housing. Each of the spindles has a central portion and a pair of lateral portions. A plurality of paddles is attached to each one of the central portions. The central portions are positioned such that the spindles are rotated when jets of water from the nozzles strike the paddles. A plurality of bristles is attached to each one of the lateral portions of the spindles.

12 Claims, 6 Drawing Sheets

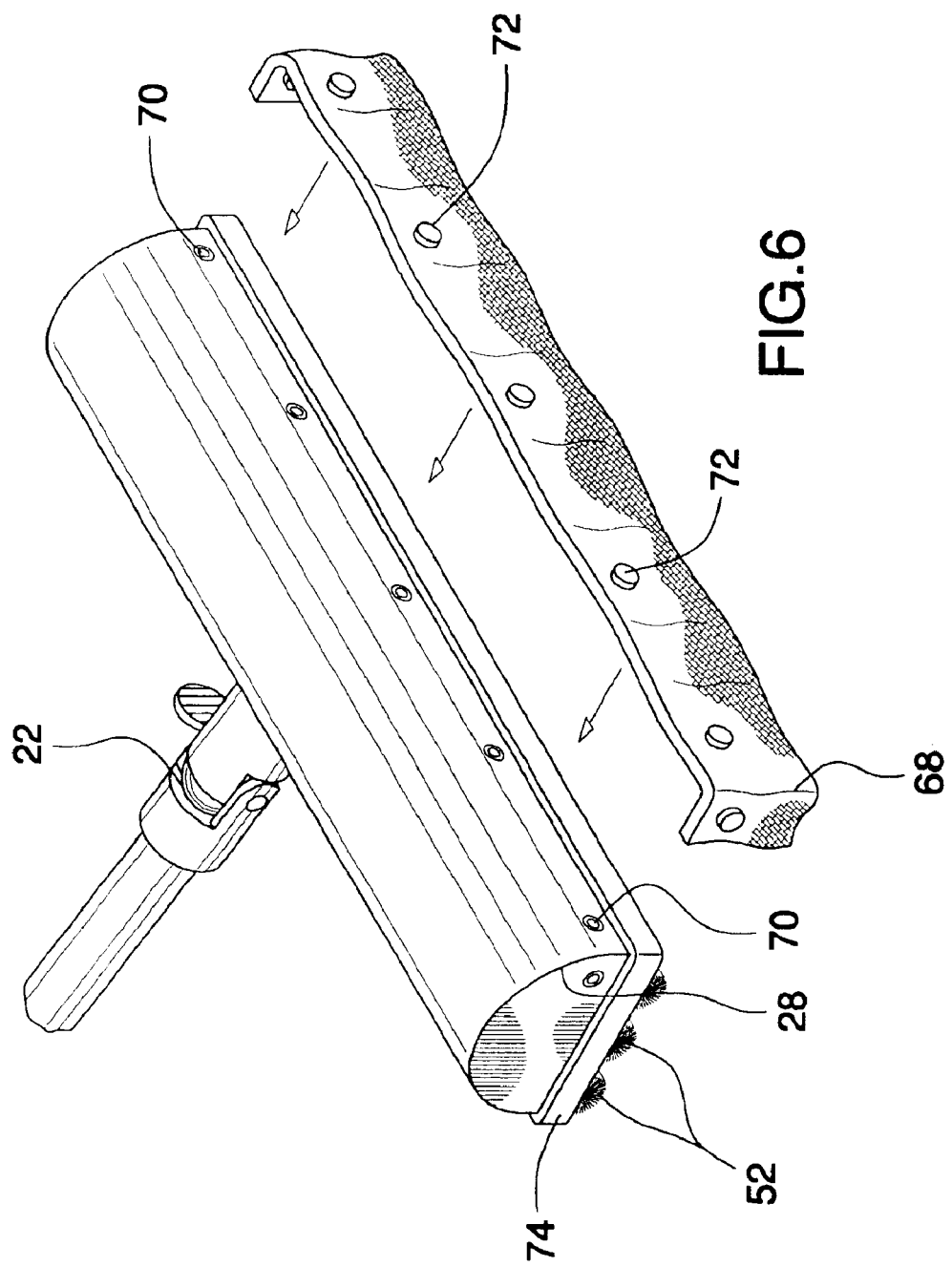

VEHICLE WASHING DEVICE

BACKGROUND OF THE INVENTION

1. Field of the Invention

The present invention relates to vehicle washing tools and more particularly pertains to a new vehicle washing tool for cleaning a surface of a vehicle.

2. Description of the Prior Art

The use of vehicle washing tools is known in the prior art. U.S. Pat. No. 4,207,640 describes a device that uses water to drive a rotating brush that rotates in a circular motion for cleaning a vehicle. Another type of vehicle washing tool is U.S. Pat. No. 4,279,051 having a plurality of brushes of that rotate in a circular motion. Yet another device that uses brushes that rotate in a circular motion for cleaning a vehicle includes U.S. Pat. No. 4,374,444.

While these devices fulfill their respective, particular objectives and requirements, the need remains for a device that uses water to drive brushes that rotate along a longitudinal axis instead of in a circular motion. This is preferred as circular motions on a vehicle surface can leave circular marks in the finish of the surface which become visible in high sunlight.

SUMMARY OF THE INVENTION

The present invention meets the needs presented above by comprising an elongated tubular member having a first end and a second end. A coupler is fluidly coupled to the first end for selectively fluidly coupling with a water supply hose. A housing includes a top wall and a peripheral wall attached to and extending downward from the top wall. The peripheral wall includes a back wall, a front wall, and a pair of side walls. The second end of the tubular member is attached to the top wall of the housing and is fluidly coupled to a plurality of nozzles mounted in the housing. A plurality of spindles is rotatably mounted in the housing and extends between the side walls. Each of the spindles is positioned generally adjacent to a bottom edge of the peripheral wall. Each of the spindles has a central portion and a pair of lateral portions positioned on opposite sides of the central portion. A plurality of paddles is attached to each one of the central portions and radially extends outwardly away therefrom. The central portions are positioned adjacently to a jet of water directed by one of the nozzles such that the spindles are rotated in a first direction when the jets of water strike the paddles. A plurality of bristles is attached to each one of the lateral portions of the spindles and extends outwardly away therefrom.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a schematic perspective view of the present invention.

DESCRIPTION OF THE PREFERRED EMBODIMENT

Figure 1:
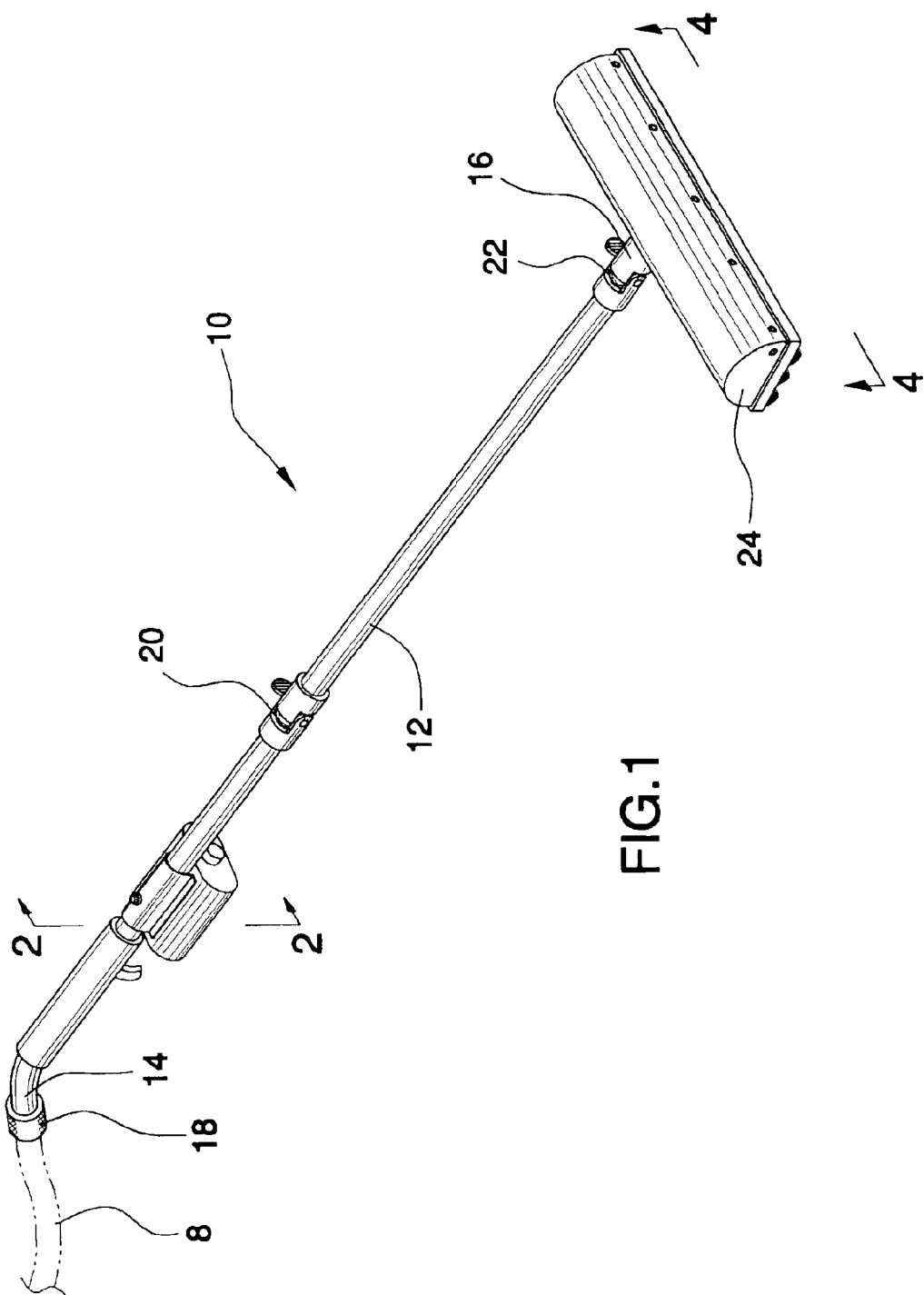
FIG. 1 is a schematic perspective view of a vehicle washing device according to the present invention.
Figure 2:
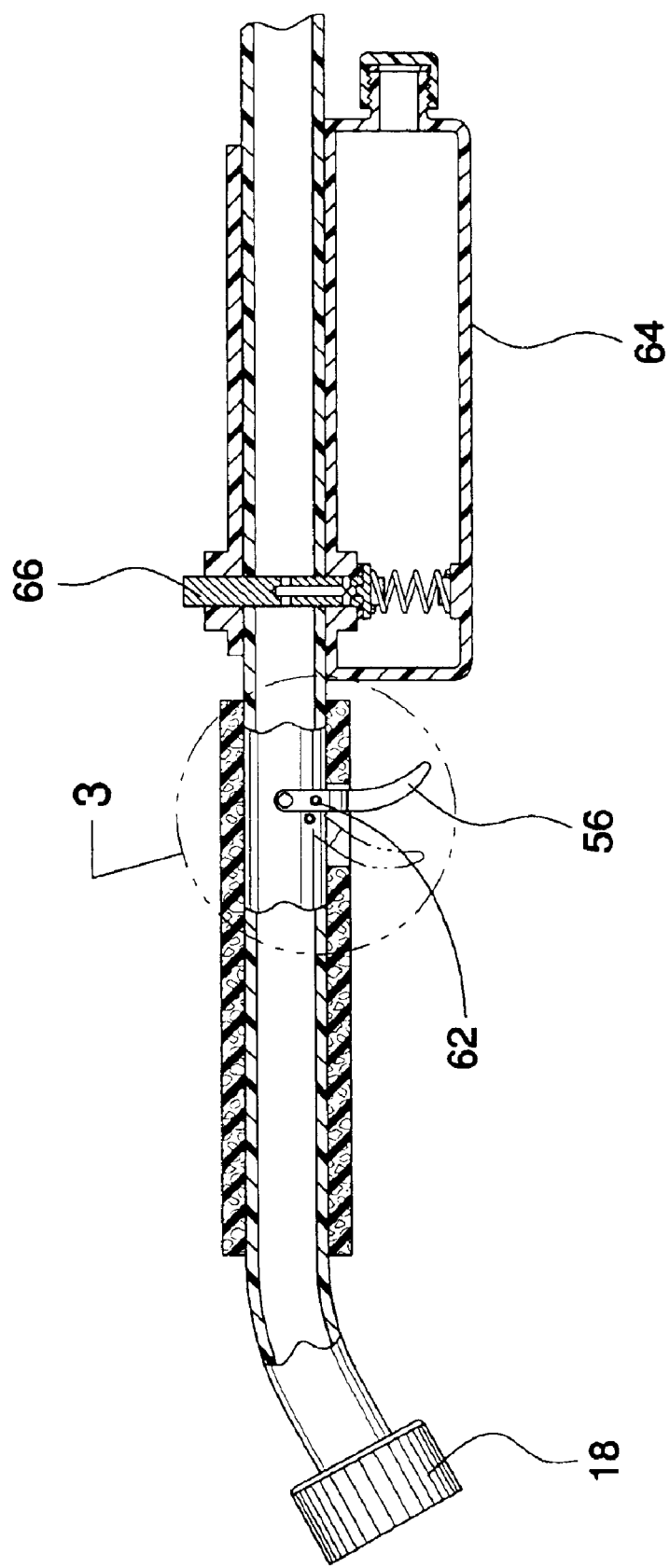
FIG. 2 is a schematic cross-sectional view taken along line 2-2 of FIG. 1 of the present invention.
Figure 3:
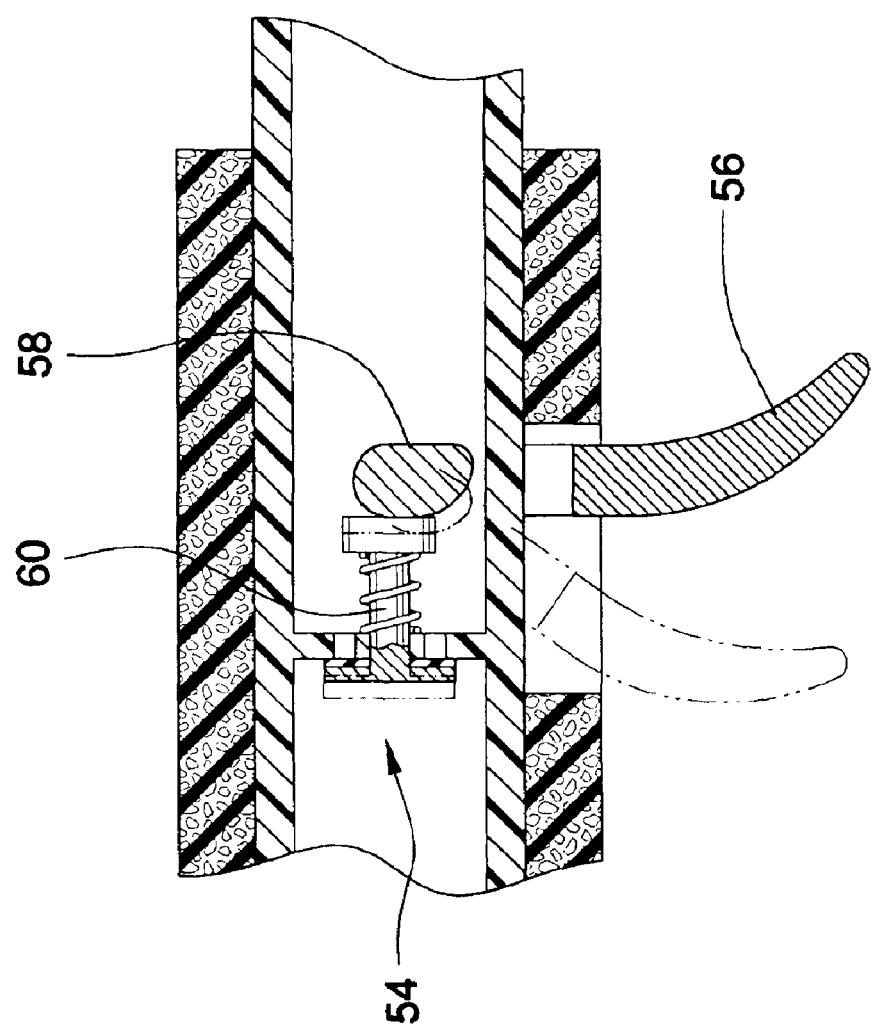
FIG. 3 is a schematic exploded view of section 3 of FIG. 2 of the present invention.
Figure 4:
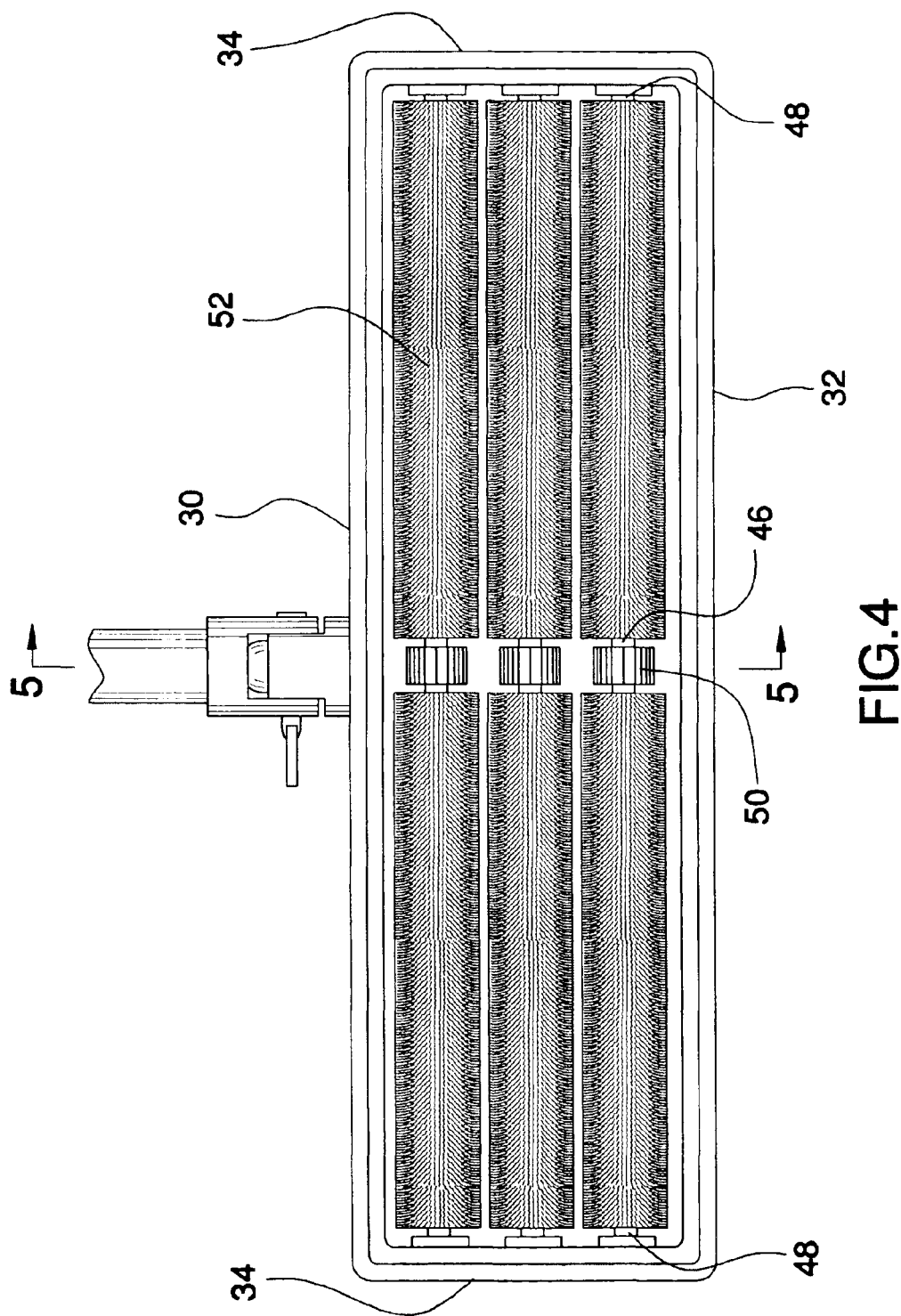
FIG. 4 is a schematic cross-sectional view taken along line 4-4 of FIG. 1 of the present invention.
Figure 5:
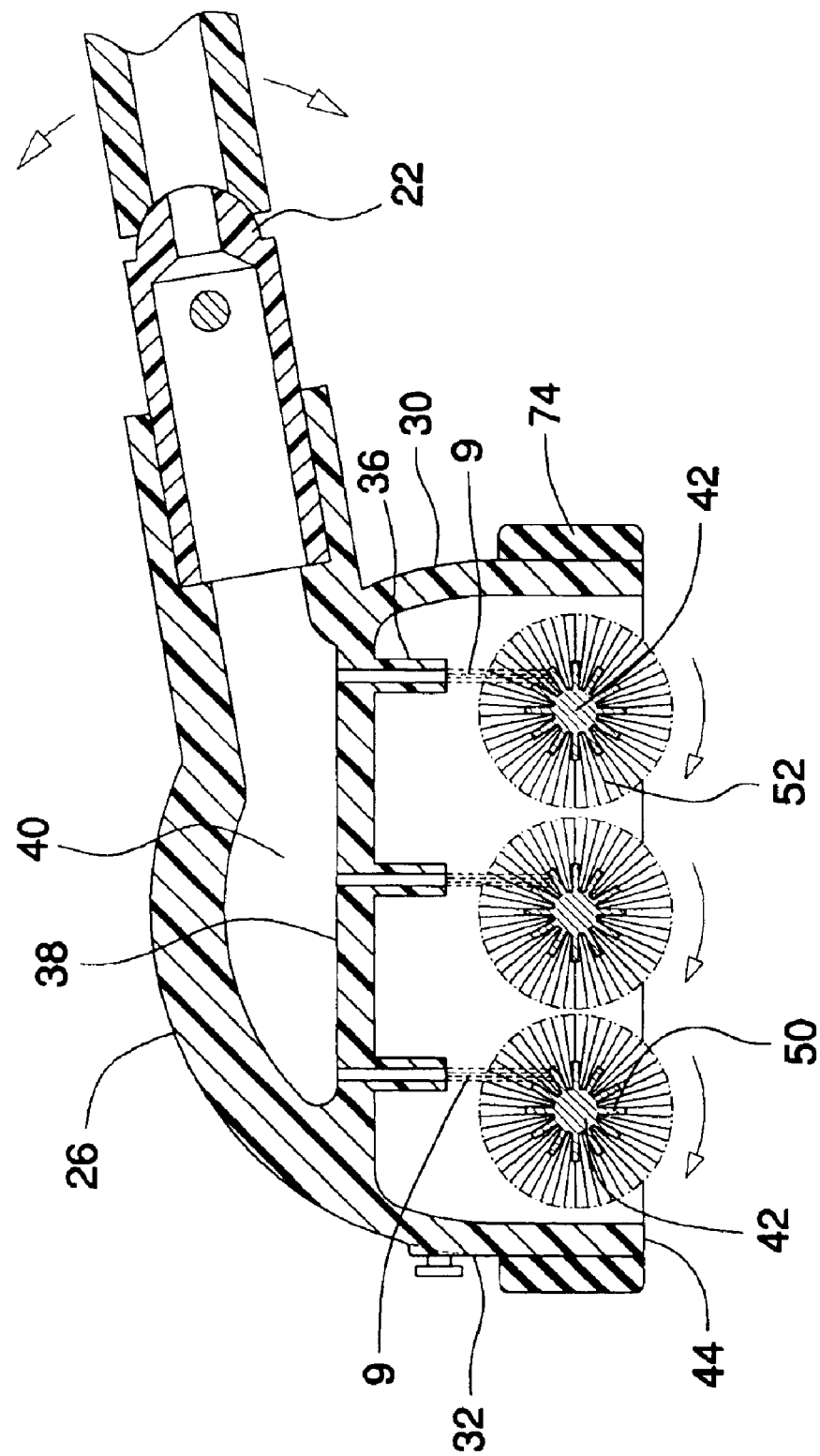
FIG. 5 is a schematic cross-sectional view taken alone line 5-5 of FIG. 4 of the present invention.

With reference now to the drawings, and in particular to FIGS. 1 through 6 thereof, a new vehicle washing tool embodying the principles and concepts of the present invention and generally designated by the reference numeral 10 will be described.

As best illustrated in FIGS. 1 through 6, the vehicle washing device 10 generally comprises an elongated tubular member 12 having a first end 14 and a second end 16. A coupler 18 is fluidly coupled to the first end 14 for selectively fluidly coupling with a water supply hose 8. The coupler 18 comprises a threaded female coupler. The tubular member 12 includes a first pivot member 20 positioned therein for selectively altering an angle of the tubular member 12. The first pivot member 20 is positioned generally between the first 14 and second 16 ends. The tubular member 12 preferably includes a second pivot member 22 positioned therein positioned generally adjacent to the second end 16.

A housing 24 includes a top wall 26 and a peripheral wall 28 that is attached to and extends downward from the top wall 26. The peripheral wall 28 includes a back wall 30, a front wall 32, and a pair of side walls 34. The second end 16 of the tubular member is attached to the top wall 26 of the housing 24 and is fluidly coupled to a plurality of nozzles 36 mounted in the housing 24. The tubular member 12 is preferably positioned adjacent to and extending away from the back wall 30. The nozzles 36 are generally aligned from the back wall 30 to the front wall 32 and are positioned generally between the side walls 34. The plurality of nozzles 36 preferably includes three nozzles. The nozzles 36 may be formed by a dividing wall 38 positioned in the housing 24 such that a compartment 40 is defined into which water will flow from the tubular member 12. The nozzles 36 extend downward from the dividing wall 38. The nozzles 36 direct jets of water 9 downwardly and outwardly of the housing 24.

Each of a plurality of spindles 42 is rotatably mounted in the housing 24 and extends between the side walls 34. Each of the spindles 42 is positioned generally adjacent to a bottom edge 44 of the peripheral wall 28. The spindles 42 are spaced equidistant from each other and are orientated parallel to each other. The spindles 42 each have a central portion 46 and a pair of lateral portions 48 positioned on opposite sides of the central portion 46. A plurality of paddles 50 is attached to each one of the central portions 46 and radially extends outwardly away therefrom. The central portions 46 are each positioned adjacently to one of the jets of water 9 directed by one of the nozzles 36 such that the spindles 42 are rotated in a first direction when the jets of water 9 strike the paddles 50. The plurality of spindles 42 is preferably three spindles.

A plurality of bristles 52 is attached to each one of the lateral portions 48 of the spindles 42 and extends outwardly away therefrom. A length of each of the bristles 52 is less than half of a distance between an adjacent pair of spindles 42. The bristles 52 extend outwardly of an opening defined by the bottom edge 44 of the peripheral wall 28.

An actuator valve 54 for selectively allowing water flow through the tubular member 12 is mounted on and fluidly coupled to the tubular member 12. The actuator valve 54 is positioned generally adjacent to the first end 14 of the tubular member 12. The actuator valve 54 preferably includes a trigger 56 attached to a cam 58 pivotally mounted in the tubular member 12. The cam 58 engages a valve 60 for selectively positioning the valve 60 in an open position or closed position. Ideally, a detent 62 is positioned on the trigger 56 for selectively locking the trigger 56 in an open position.

A soap container 64 is fluidly coupled to the tubular member 12. A soap dispensing valve 66 is fluidly coupled to the soap container 64 for selectively introducing a liquid soap positioned within the soap container 64 into the tubular member 12.

An absorbent panel 68 has a first side and a second side. A fastening assembly is adapted for removably coupling the absorbent panel 68 to the front wall 32 of the housing 24 such that the absorbent panel 68 extends downwardly from the bottom edge 44 of the peripheral wall 28. The fastening assembly preferably includes a plurality of male 70 and female 72 snap combinations though a hook and loop assembly may also be utilized.

It is preferred that elastomeric cushioning material 74 is attached to and generally extends around the peripheral wall 28. The cushioning material 74 prevents the housing from damaging a vehicle being cleaned.

In use, the tubular member 12 is fluidly coupled to a water supply hose 8. As water flows through the housing 24, it is directed outwardly through the nozzles 36 such that it strikes the paddles 50 and causes the spindles 42 to rotate. The bristles 52 are positioned against a surface to be cleaned and rotate thereon. Soap may be injected into the water to aid in the cleaning process. The panel 68 may be attached for catching excess water and to aid in the drying of the vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device for washing the exterior of a vehicle, said device comprising:

an elongated tubular member having a first end and a second end, a coupler being fluidly coupled to said first end for selectively fluidly coupling with a water supply hose;

a housing including a top wall and a peripheral wall being attached to and extending downward from said top wall, said peripheral wall including a back wall, a front wall, and a pair of side walls, said second end of said tubular member being attached to said top wall of said housing and being fluidly coupled to a plurality of nozzles mounted in said housing;

a plurality of spindles being rotatably mounted in said housing and extending between said side walls, each of said spindles being positioned generally adjacent to a bottom edge of said peripheral wall, each of said spindles having a central portion and a pair of lateral portions positioned on opposite sides of said central portion, a plurality of paddles being attached to each one of said central portions and radially extending outwardly away therefrom, each of said central portions being positioned adjacently to a jet of water directed by one of said nozzles such that said spindles are rotated in a first direction when the jets of water strike said paddles; and a plurality of bristles being attached to each one of said lateral portions of said spindles and extending outwardly away therefrom.

2. The device of claim 1, wherein said tubular member includes a first pivot member positioned therein for selectively altering an angle of said tubular member, said first pivot member being positioned generally between said first and second ends, said tubular member including a second pivot member positioned therein positioned generally adjacent to said second end.

3. The device of claim 1, further including an actuator valve for selectively allowing water flow through said tubular member, said actuator valve being mounted on and fluidly coupled to said tubular member.

4. The device of claim 3, wherein said actuator valve is positioned generally adjacent to said first end of said tubular member.

5. The device of claim 1, further including a soap container being fluidly coupled to said tubular member.

6. The device of claim 5, further including a soap dispensing valve being fluidly coupled to said soap container for selectively introducing a liquid soap positioned within said soap container into said tubular member.

7. The device of claim 3, further including a soap container being fluidly coupled to said tubular member.

8. The device of claim 7, further including a soap dispensing valve being fluidly coupled to said soap container for selectively introducing a liquid soap positioned within said soap container into said tubular member.

9. The device of claim 7, further including an absorbent panel having a first side and a second side, a fastening assembly being adapted for removably coupling said absorbent panel to said front wall of said housing such that said absorbent panel extends downwardly from said bottom edge of said peripheral wall.

10. The device of claim 3, further including an absorbent panel having a first side and a second side, a fastening assembly being adapted for removably coupling said absorbent panel to said front wall of said housing such that said absorbent panel extends downwardly from said bottom edge of said peripheral wall.

11. The device of claim 1, further including an absorbent panel having a first side and a second side, a fastening assembly being adapted for removably coupling said absorbent panel to said front wall of said housing such that said absorbent panel extends downwardly from said bottom edge of said peripheral wall.

12. A device for washing the exterior of a vehicle, said device comprising:

an elongated tubular member having a first end and a second end, a coupler being fluidly coupled to said first end for selectively fluidly coupling with a water supply hose, said coupler comprising a threaded female coupler, said tubular member including a first pivot member positioned therein for selectively altering an angle of said tubular member, said first pivot member being positioned generally between said first and second ends, said tubular member including a second pivot member positioned therein positioned generally adjacent to said second end;

a housing including a top wall and a peripheral wall being attached to and extending downward from said top wall, said peripheral wall including a back wall, a front wall, and a pair of side walls, said second end of said tubular member being attached to said top wall of said housing and being fluidly coupled to a plurality of nozzles mounted in said housing, said nozzles being generally aligned from said back wall to said front wall and being positioned generally between said side walls, said plurality of nozzles including three nozzles;

a plurality of spindles being rotatably mounted in said housing and extending between said side walls, each of said spindles being positioned generally adjacent to a bottom edge of said peripheral wall, said spindles being spaced equidistant from each other and being orientated parallel to each other, each of said spindles having a central portion and a pair of lateral portions positioned on opposite sides of said central portion, a plurality of paddles being attached to each one of said central portions and radially extending outwardly away therefrom, each of said central portions being positioned adjacently to a jet of water directed by one of said nozzles such that said spindles are rotated in a first direction when the jets of water strike said paddles, said plurality of spindles being three spindles;

a plurality of bristles being attached to each one of said lateral portions of said spindles and extending outwardly away therefrom, wherein a length of each of said bristles is less than half of a distance between an adjacent pair of spindles, said bristles extending outwardly of an opening defined by said bottom edge of said peripheral wall;

an actuator valve for selectively allowing water flow through said tubular member, said actuator valve being mounted on and fluidly coupled to said tubular member, said actuator valve being positioned generally adjacent to said first end of said tubular member;

a soap container being fluidly coupled to said tubular member, a soap dispensing valve being fluidly coupled to said soap container for selectively introducing a liquid soap positioned within said soap container into said tubular member;

an absorbent panel having a first side and a second side, a fastening assembly being adapted for removably coupling said absorbent panel to said front wall of said housing such that said absorbent panel extends downwardly from said bottom edge of said peripheral wall.

* * * * *